US005538322A

United States Patent [19]
Cone et al.

[11] Patent Number: 5,538,322
[45] Date of Patent: Jul. 23, 1996

[54] CHILD CAR SEAT WITH ADJUSTABLE BARRIER SHIELD

[75] Inventors: Richard E. Cone, Athens, Ohio; Donald L. Gerken, Columbus, Ind.

[73] Assignee: Cosco, Inc., Columbus, Ind.

[21] Appl. No.: 131,216

[22] Filed: Oct. 1, 1993

[51] Int. Cl.⁶ ................................................ A47C 1/08
[52] U.S. Cl. ............................ 297/256.15; 297/216.11; 297/467
[58] Field of Search .................... 297/216.11, 256.15, 297/467, 487, 488

[56] References Cited

U.S. PATENT DOCUMENTS

| 4,067,608 | 1/1978 | Von Wimmersperg | 297/216.11 |
| 4,429,916 | 2/1984 | Hyde | 297/256.15 |
| 4,662,683 | 5/1987 | Knoedler et al. | |
| 4,729,600 | 3/1988 | Single, II et al. | 297/256.15 X |
| 4,743,064 | 5/1988 | Takizawa | 297/216.11 X |
| 5,061,012 | 10/1991 | Parker et al. | 297/256.15 X |

FOREIGN PATENT DOCUMENTS 1243930  11/1988  Canada .................... 297/467

Primary Examiner—Laurie K. Cranmer
Attorney, Agent, or Firm—Barnes & Thornburg

[57] ABSTRACT

A car seat is provided for restraining a child seated in the car seat. The car seat includes a seat shell having a bottom seat portion and a back support portion. A barrier shield is supported above the bottom seat portion and is pivotable from an initial position to a child-restraining position. A child-restraining harness is attached to the seat shell and extends over an upper torso of the child when the child is seated in the car seat to restrain forward motion of the child. The child-restraining harness is connected to the barrier shield. The barrier shield is located at the initial position when a child is harnessed in the child seat. The child-restraining harness moves the barrier shield from the initial position to a child-restraining position when the upper torso of the child harnessed into the child seat moves forward to push against the child-restraining harness.

47 Claims, 4 Drawing Sheets

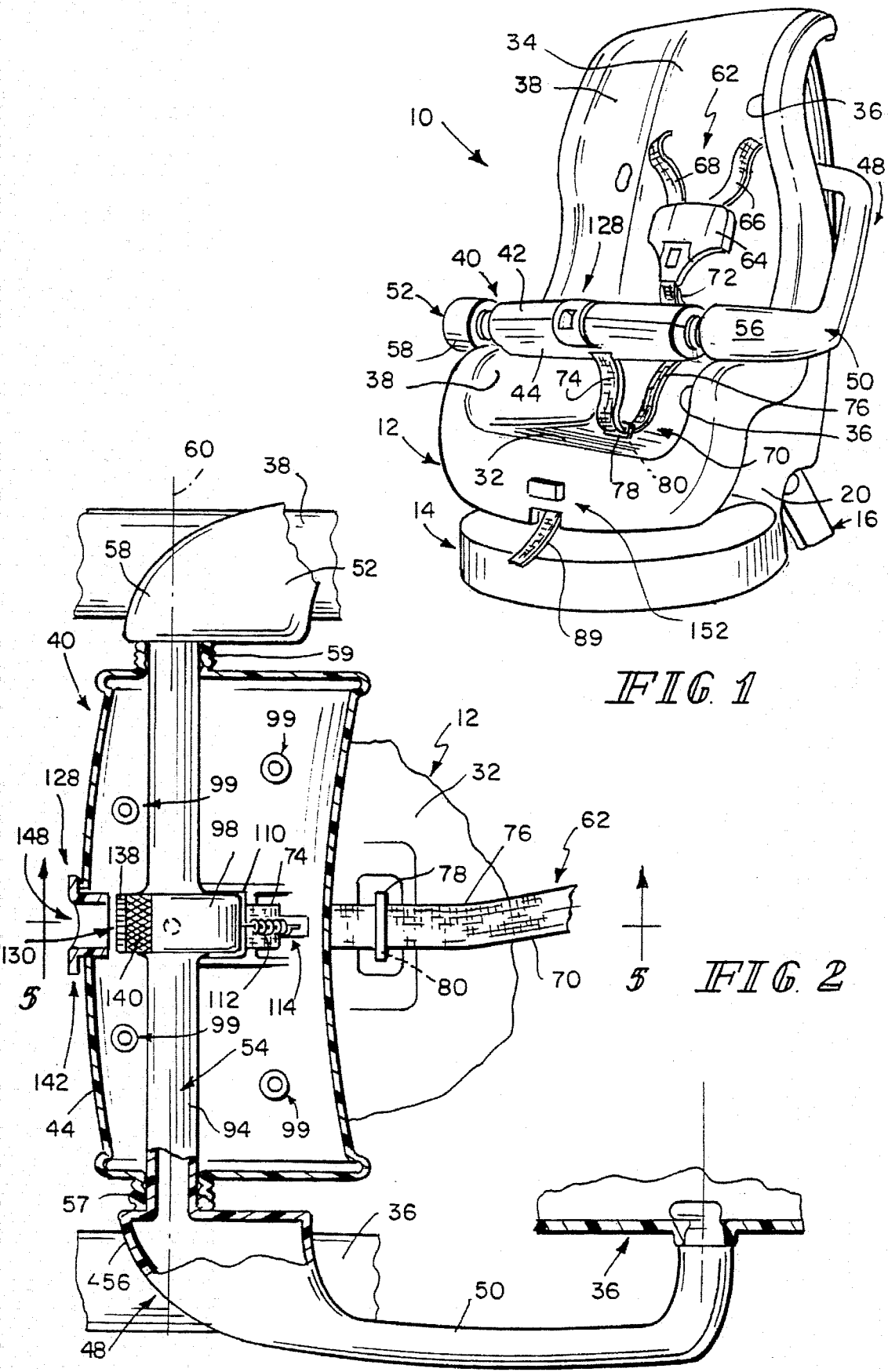

CHILD CAR SEAT WITH ADJUSTABLE BARRIER SHIELD

BACKGROUND AND SUMMARY OF THE INVENTION

The present invention relates to juvenile car seats, and particularly to juvenile car seats having restraint systems for minimizing injury to a seated child in case the vehicle in which the seat is being used stops suddenly or is involved in an accident. More particularly, the present invention relates to a child car seat with a barrier shield positioned in front of a child seated in the child car seat.

Child car seats having movable safety shields are known. See, for example, U.S. Pat. Nos. 4,500,135 to Kincheloe; 4,159,127 to Czernakowski et al.; and 4,190,288 to Korger. It is also known to provide abdominal shields in child car seats. See, for example, U.S. Pat. Nos. 4,456,302 to Knoedler et al.; 4,662,683 to Knoedler et al.; 4,880,277 to Takahashi et al.; 4,687,255 to Klanner et al.; and 4,342,483 to Takada.

What is needed is an improved child car seat provided with an adjustable shield that moves automatically during a sudden vehicle stop to retain a child in the child car seat without loading the crotch area of the child by tightening a child-restraining harness. An improved child car seat having a child restraint shield that would move against the thigh region of a child seated in the child car seat to minimize the effect of "submarining" movement of a seated child during sudden vehicle stops would be welcomed by consumers.

According to the present invention, a child car seat is provided for restraining a child seated in the car seat. The child car seat includes a seat shell having a bottom seat portion and a back seat portion, a barrier shield, and means for supporting the barrier shield above the bottom seat portion for pivoting movement between an initial position and a child-restraining position. The child car seat further includes spring means for yieldably biasing the pivotable barrier shield to its initial position and harness means for pivoting the spring-loaded barrier shield to its child-restraining position in response to forward movement of a child seat in the seat shell away from the back seat portion and toward the barrier shield during a sudden vehicle stop.

In preferred embodiments, the barrier shield is a pivotable unit that is positioned to lie adjacent to the thighs and abdomen of a child car seat occupant. The shield is coupled by a crotch strap to a shoulder harness assembly that is arranged to embrace a child seated in the child car seat. During a sudden vehicle stop, the barrier shield pivots downwardly toward the bottom seat portion in opposition to a return spring so as to block submarining movement and discharge of a child from the child car seat underneath the shield.

Illustratively, the bottom seat portion is formed to include strap connector means for anchoring a middle portion of the crotch strap to the bottom seat portion. The strap connector means is defined by a buckle case mounted in the bottom seat portion and arranged to lie between the legs of a child seated in the seat shell. A first end of the crotch strap is fixed to a connection device coupled to the shoulder harness assembly, a second end of the crotch strap is fixed to the pivotable barrier shield, and a buckle is formed to include a guide slot slidably receiving a middle portion of the crotch strap. The buckle has a tongue below the strap-receiving guide slot and is connectable to and disconnectable from the buckle case.

During a sudden vehicle stop, the shoulder harness assembly will tighten up as a result of forward movement of the upper body of a child seated in the seat shell. The tightened shoulder harness pulls on the first end of the crotch strap attached to the connection device, thereby pulling the middle portion of the crotch strap through the strap-receiving guide slot formed in the buckle while the buckle tongue is anchored to the strap connector means provided in the bottom seat portion. Pulling on the middle portion of the crotch strap causes the second end of the crotch strap to be pulled down toward the bottom seat portion. This downward movement of the second end of the crotch strap causes the pivotable barrier shield to pivot downwardly under the control of the crotch strap to its child-restraining position against the thigh region of the child seated in the seat shell.

Advantageously, the improved child car seat includes a barrier shield that pivots to a position which helps to retain the child in the seat without loading the crotch area of the child with a tighter harness. Although the crotch strap is pulled to actuate the pivotable barrier shield, the crotch strap is positioned and guided during such shield actuation to maintain the comfort and safety of the child seated in the seat shell.

The child car seat also includes a visual indicator to help adults monitor the pivoted position of the pivotable barrier shield during harnessing of a child seated in the seat shell. Illustratively, the visual indicator includes a colored or marked display panel that moves in a window formed in a front portion of the barrier shield to advise an adult whether the barrier shield has been pivoted about an axle arm toward its child-restraining position.

Additional features and advantages of the invention will become apparent to those skilled in the art upon consideration of the following detailed description of a preferred embodiment of the invention as presently perceived.

BRIEF DESCRIPTION OF THE DRAWINGS

The detailed description particularly refers to the accompanying figures in which:

FIG. 1 is a perspective view of a child car seat in accordance with the present invention showing a seat shell, a pivotable barrier shield mounted on a swing seat shell, an arm assembly, a crotch strap coupled to the pivotable barrier shield and arranged to pass through a strap-receiving slot formed in the buckle anchored to the bottom seat portion of the seat shell, and a pair of shoulder straps;

FIG. 2 is a view showing a buckle tongue-receiving opening formed in a buckle case mounted in the bottom seat portion of the seat shell of FIG. 1 and showing a horizontal section of the swing arm assembly and the pivotable barrier shield of FIG. 1;

FIG. 5 is a view similar to FIG. 5 showing the position of the stretched return spring inside the barrier shield and the location of the position display panel adjacent to the position-indicating window after the barrier shield has been pivoted by the crotch strap to its child-restraining position as shown in FIG. 4.

DETAILED DESCRIPTION OF THE DRAWINGS

Figure 3:
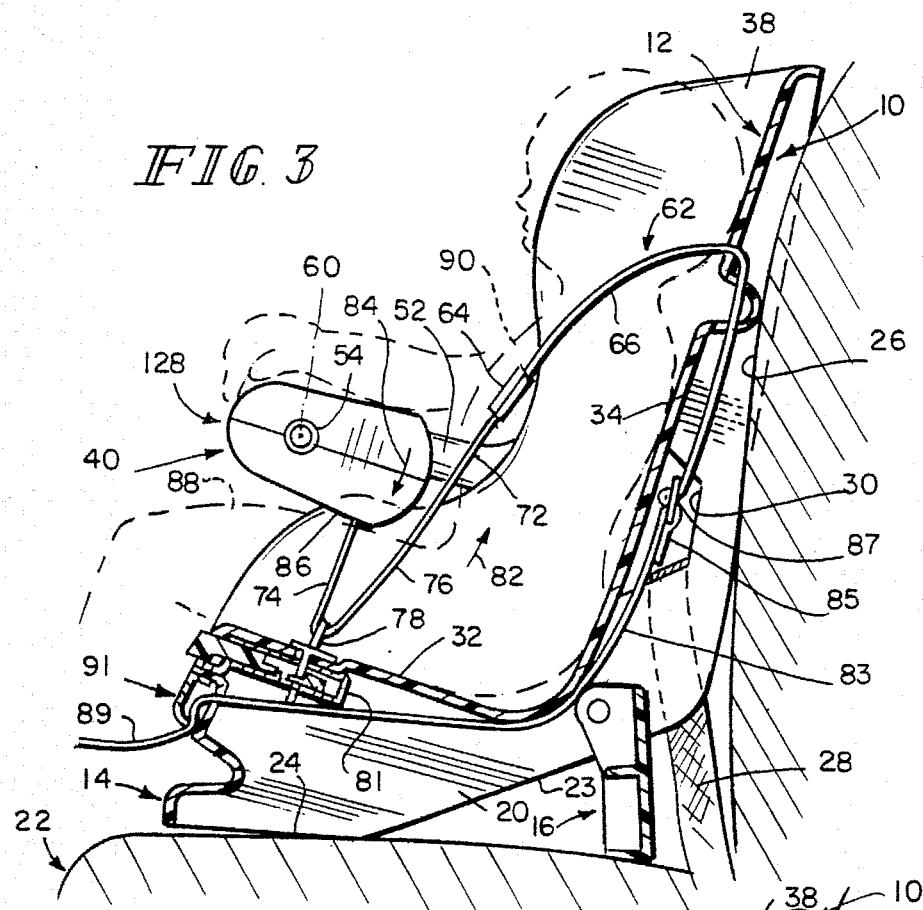
FIG. 3 is a sectional view of the child car seat of FIG. 1 lying in place on a passenger seat in a vehicle and carrying a child restrained by a harness and the barrier shield.
Figure 4:
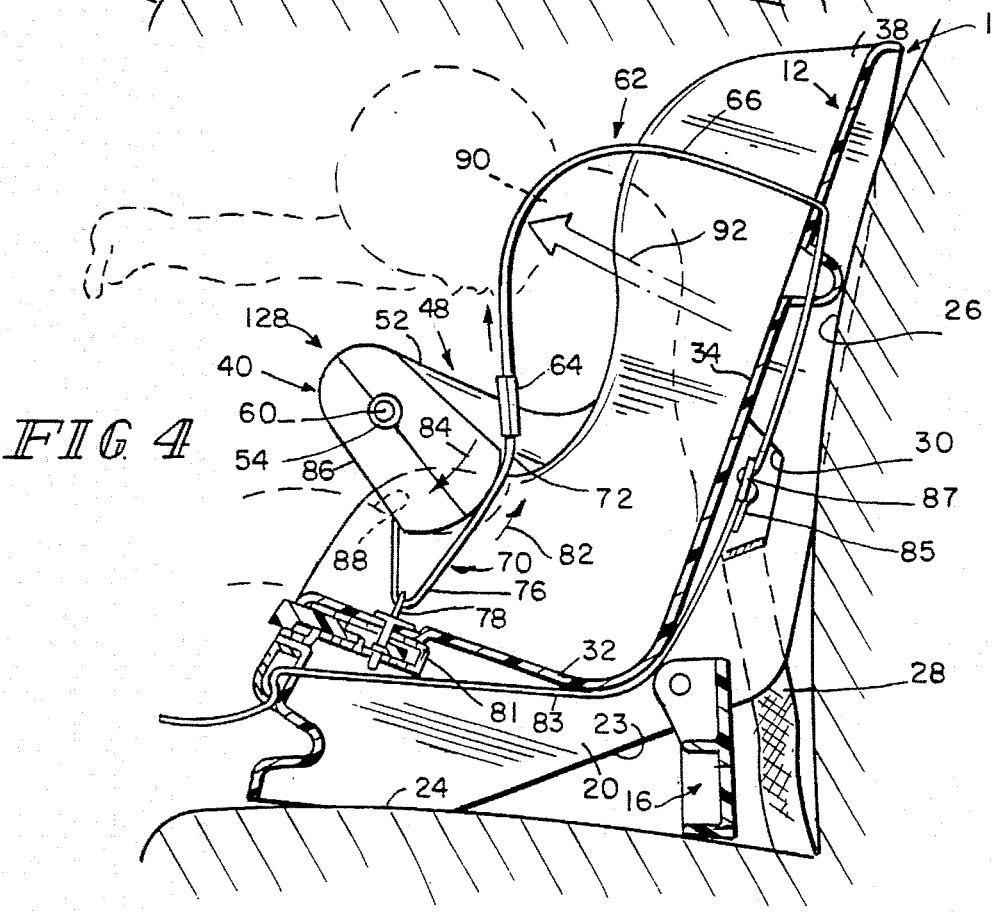
FIG. 4 is a view similar to FIG. 3 showing downward pivoting of the barrier shield about an axle arm in the swing arm assembly caused by pulling on the crotch strap in response to movement of the seated child in a forward direction during a sudden vehicle stop.

A child car seat 10 includes a seat shell 12, a base 14, and a pivotable support leg 16 as shown in FIGS. 1, 3, and 4. Illustratively, seat shell 12 and base 14 are molded out of plastics material to form a child-supporting seat. The child car seat 10 can be converted for use as a forward-facing seat or a rearward-facing seat by movement of pivotable support leg 16 relative to the base 14.

Child car seat 10 is easily set up for use as a forward-facing seat by pivoting the pivotable support leg 16 to its unfold seat-engaging position shown in FIGS. 1, 3, and 4. Alternatively, the pivotable support leg 16 can be pivoted toward a bottom area 20 of base 14 to its retracted position (not shown) to permit a user to mount the child car seat 10 on passenger seat 22 so that bottom wall 23 of the base 14 rests directly on seat 24 and the seated child faces toward seat back 26. In either case, a vehicle belt assembly 28 on passenger seat 22 passes through an aperture 30 formed in child car seat 10 to hold the child car seat 10 in a fixed position on the passenger seat 22.

The seat shell 12 includes a bottom seat portion 32 for supporting a child's bottom and upper legs and a back support portion 34. The back support portion 34 preferably has a greater height than the "height" of the child sitting in the seat 10 so that the top of the back support portion 34 is above the top of the child's head when the child is seated in the seat 10. First and second side wall portions 36, 38 include side arm portions and are provided for preventing lateral movement of the child in the seat 10. A cushion (not shown) can be nested and mounted in the child-receiving portion of the seat 10 for added comfort.

Figure 5:
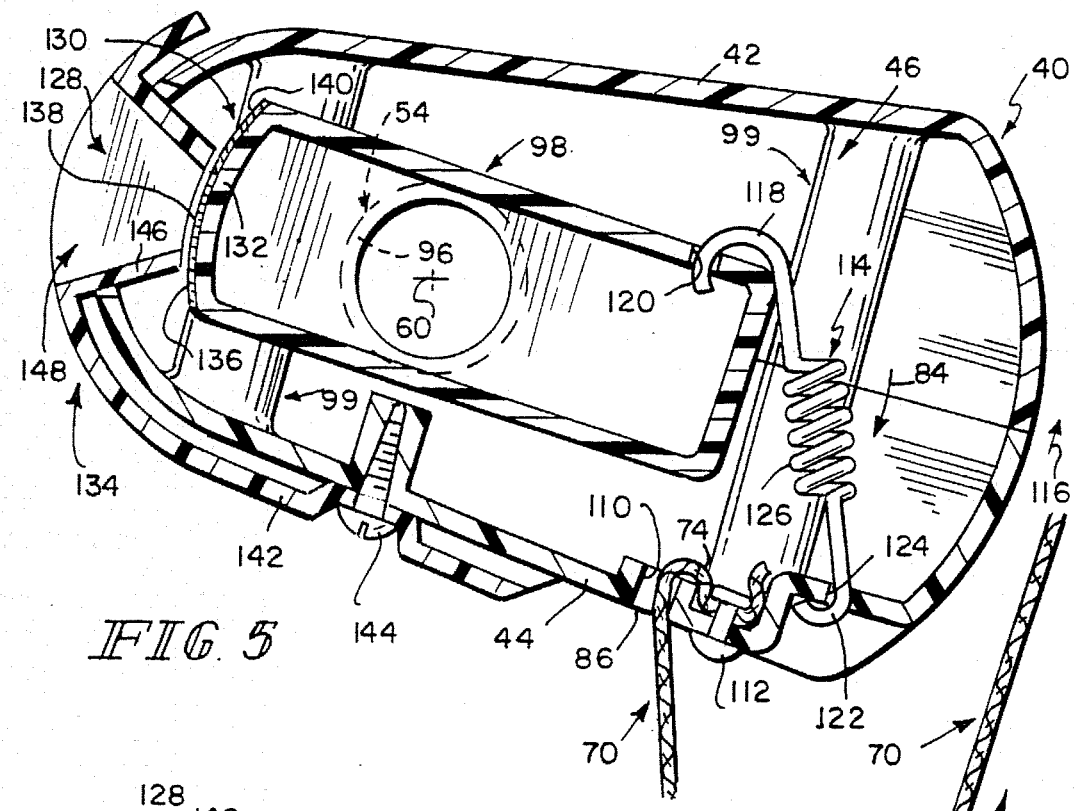
FIG. 5 is a view taken along line 5—5 of FIG. 2 showing the position of a return spring inside the barrier shield and the location of a position display panel adjacent to a position-indicating window when the barrier shield is held by the crotch strap in its initial position as shown in FIG. 3.
Figure 6:
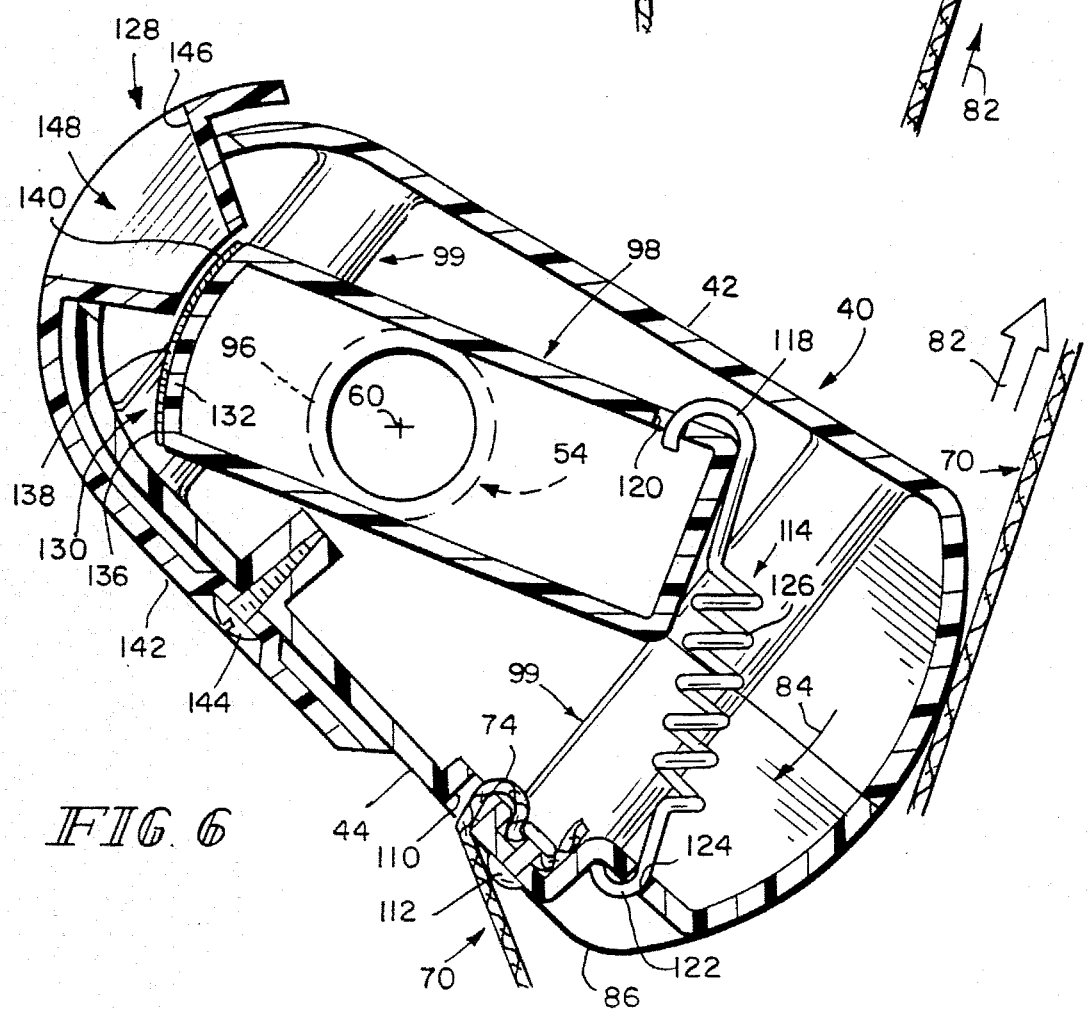
FIG. 6 is an enlarged view of the buckle case mounted in the bottom seat portion of the seat shell and shown in FIG. 3 showing a user manually pushing a spring-loaded push button in an inward direction to disengage a locking bar from the buckle tongue so that the user can withdraw the buckle tongue of the crotch strap-carrying bucket from engagement with the buckle case.

A restraint system including a pivotable barrier shield 40 is provided for restraining forward movement of a child in seat 10 during a sudden vehicle stop. Barrier shield 40 includes a top shell 42 mated to a bottom shell 44 to form a hollow interior region 46 therebetween as shown in FIGS. 1, 5, and 6. A mounting and supporting means such as blow-molded, unitary, U-shaped tubular swing arm unit 48 is provided for holding the pivotable barrier shield 40. The swing arm unit includes a left swing arm 50 pivotably connected to first side wall 36, a right swing arm 52 pivotably connected to second side wall 38, and an axle arm 54 arranged to extend through the interior region 46 of the barrier shield 40 and interconnect the free ends 56, 58 of the left and right swing arms 52, 54.

The pivotable barrier shield 40 is mounted on the axle arm 54 at pivot mounts 57, 59, as shown in FIGS. 2, 5, and 6, for pivoting movement about horizontal pivot axis 60. As shown in FIG. 1, the left swing arm 50 rests on the side arm portion of first side wall portion 36 and the right swing arm 52 rests on the side arm portion of second side wall portion 38 when a child (not shown) is seated in child car seat 10 in a restrained position.

Figure 7:
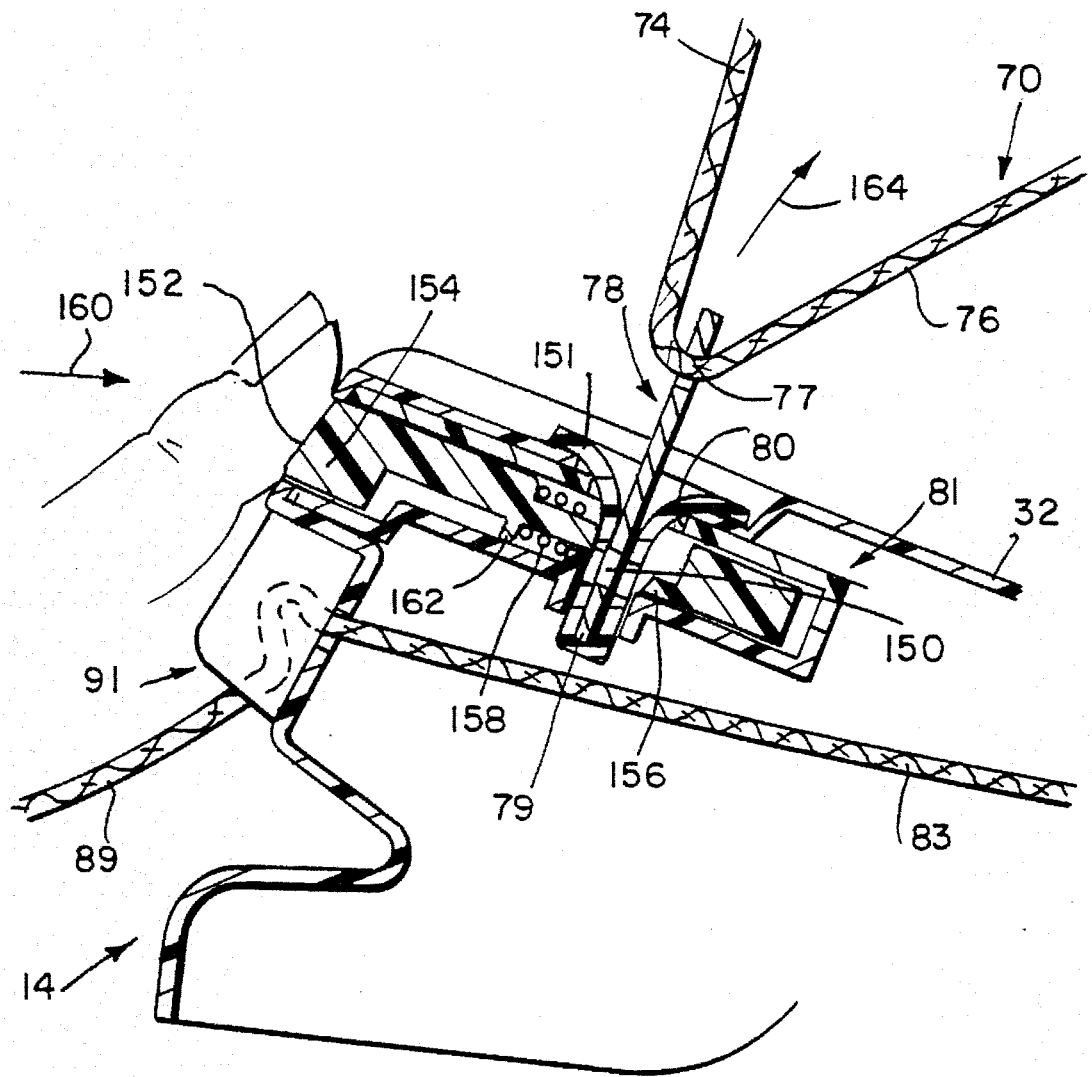

A harness assembly 62 is provided for further restraining a child's movement relative to the seat shell 12. Harness assembly 62 includes a connecting device 64, left and right shoulder straps 66, 68, and a crotch strap 70. The shoulder straps 66, 68 are fixed to the child car seat 10 and extend from the connecting device 64 through apertures formed in the back support portion 34 of the seat shell 12. The crotch strap 70 has a first end 72 anchored to the connecting device 64, a second end 74 anchored to the pivotable barrier shield 40, and a middle portion 76 slidably passing through a strap guide slot 77 formed in a buckle 78. The buckle 78 includes a buckle tongue 79 that is releasably received in a buckle-receiving slot 80 provided in a buckle case 81 that is mounted in the bottom seat portion 32 of the seat shell 12 as shown in FIGS. 1, 3, and 7. The operation of buckle 78 and buckle case 81 will be described in more detail below.

The harness assembly 62 also includes a bottom strap 83 having an upper end 85 coupled to shoulder straps 66, 68 at a first A-lock unit 87 as shown in FIG. 3 and 4. Bottom strap 83 has a lower end 89 passing through a second A-lock unit 91 as shown in FIGS. 3, 4, and 7. These A-lock units 87, 91 are conventional mechanisms and operate in the conventional way to manage adjustment of the harness assembly 62.

In use, a child is placed in a normal seating position in seat 10 as shown in FIG. 3 and the harness assembly 62 is arranged to position crotch strap 70 between the child's legs and shoulder straps 66, 68 against the child's shoulders. The tension on straps 66, 68, 70 is adjusted using any conventional strap adjustment means to pull crotch strap 70 in direction 82 so as to pivot barrier shield 40 downwardly in direction 84 enough to cause the bottom wall 86 on barrier shield 40 to contact the thighs 88 of a child seated in seat 10 as shown in FIG. 3. The middle portion 76 of crotch strap 70 slides in strap guide slot 77 formed in the buckle 78 connected to the buckle case 81 as the crotch strap 70 is pulled in direction 82. The harness system is thus properly tightened to hold a child snugly and comfortably in a restrained position in seat 10.

During a sudden vehicle stop, an upper body portion 90 of the child may move in forward direction 92 causing the shoulder straps 66, 68 to tighten and move as shown in FIG. 4 and thereby pull the crotch strap 70 further in direction 82. As a result, the barrier shield 40 will pivot about axis 60 downwardly in direction 84 to press firmly against the thighs 88 of the child seated in seat 10. Advantageously, this restraining action minimizes submarining movement of the child in seat 10 under barrier shield 40 during a sudden vehicle stop. In addition, this restraining action is accomplished without loading the crotch area of the child with harness assembly 62. Therefore, the barrier shield 40 and harness assembly 62 act together to minimize submarining movement without loading up the crotch strap 70.

Illustratively, the interior region 46 of pivotable barrier shield 40 is shown in FIGS. 2, 5, and 6. Axle arm 54 includes a left axle 94, a right axle 96, and a box-shaped offset portion 88 between the left and right axles 94, 96 as shown best in FIG. 2. Mounting posts 99 each include a peg 102 appended to top shell 42 and a peg-receiving cylinder 104 appended to bottom shell 44 that receives peg 102 as shown in FIGS. 2 and 5 to rigidify the barrier shield 40.

Illustratively, the second end 74 of crotch strap 70 is attached to barrier shield 40 as shown in FIG. 5. The bottom shell 44 is formed to include strap-receiving aperture 110 and the second end 74 of crotch strap 70 passes through aperture 110 and is fixed in a channel against an interior wall of bottom shell 44 by means of fastener 112. It is also possible to attach the second end 74 of crotch strap 70 to a metal belt adjustor (not shown) that can be positioned in the interior region 46 of barrier shield 40 and configured to gravity load the end 74 of crotch strap 78 in place.

A shield return spring 114 is mounted inside the interior region 46 of barrier shield 40 and arranged to urge the pivotable barrier shield 40 toward a "home" position whenever crotch strap 70 is relaxed. Because the barrier shield 40 shown in FIG. 5 has already been pivoted a bit to an "initial position" by pulling crotch strap 70 in direction 82 to press the bottom wall 86 of shield 40 against the seated child's thighs, it will be understood that when the crotch strap 70 is relaxed the shield return spring 114 will operate to pivot barrier shield 40 about axis 60 in direction 116 to return the barrier shield 40 to its home position (not shown). Return spring 114 illustratively includes a top hook 118 engaging an aperture 120 formed in an outer end of the offset portion 98 on axle arm 54, a bottom hook 122 engaging an aperture 124 formed in the bottom shell 44 of the barrier shield 40, and a coiled portion 126 shown in a slightly stretched position in FIG. 5 and a greatly stretched position in FIG. 6. Spring 114 normally causes barrier shield 40 to pivot about axis 60 in direction 116. It is within the scope of the present invention to employ any suitable spring means such as spring 114 or the like to return the pivotable barrier shield 40 to a home position whenever the harness assembly 62 is relaxed.

An indicator 128 is provided on the barrier shield 40 for visually indicating the pivoted position of the shield 40 on axle arm 54 between, for example, a home position (not shown), an initial position (shown in FIGS. 3 and 5), and a child-restraining position (shown in FIGS. 4 and 6). Illustratively, indicator 128 includes a position display panel 130 appended to an edge wall 132 of axle offset portion 98 and a window panel 134. The position display panel 130 is colored or marked to define, for example, a "home position" zone 136, an "initial position" zone 138, and a "child-restraining" zone 140 as shown in FIGS. 5 and 6. The window panel 134 includes an outer panel 142 attached to bottom shell 44 by means of fastener 144 and a window frame 146 located at one end of window panel 134 and formed to include position-indicating window 148.

At least one of the zones 136, 138, 140 are visible to a user looking at position display panel 130 through position-indicating window 148 at any time. By using this window 148, a user is able to determine the approximate pivoted position of the barrier shield 40 quickly and easily.

The buckle case 81 is shown in greater detail in FIG. 7. The buckle case 81 is mounted to lie underneath the bottom seat portion 32 of seat shell 12 and is formed to include a top-opening slot 80 for receiving strap-carrying buckle 78. The buckle 78 is formed to include a strap guide slot 77 for slidably receiving the middle portion 76 of crotch strap 70. Buckle 78 also includes a tongue 79 that is formed to include a lower latch-receiving slot 150 as shown best in FIG. 7. Illustratively, a cover 151 is optionally mounted on buckle tongue 79 as shown in FIG. 7 and is provided to guide entry of buckle tongue 79 into the top-opening slot 80 formed in buckle case 81.

A push-button assembly 152 is provided in buckle case 81 for releasing and retaining the buckle 78 in buckle case 81. Assembly 152 includes push-button member 154, a retaining latch 156 appended to push-button member 154, and a compression spring 158 mounted inside buckle case 81 and arranged normally to urge the push-button member 154 and the retaining latch 156 to the buckle-retaining position shown in FIGS. 3 and 4. In this position, retaining latch 156 fits into the latch-receiving slot 150 formed in buckle tongue 79 (and cover 151) to retain the buckle 78 in its retained position.

The technique for manually releasing the strap-carrying buckle 78 from its retained position is illustrated in FIG. 7. A user manually pushes against button member 144 to move it inwardly in direction 160 into the buckle case 81. A flange 162 on button member 154 compresses spring 158 as the button member 154 moves to disengage the retaining latch 156 appended to the button member 154 from the latch-receiving slot 150 formed in buckle tongue 79. The user is then able to withdraw buckle 78 in direction 164 to disengage buckle 78 from buckle case 81.

Although the invention has been described in detail with reference to certain preferred embodiments, variations, and modifications exist within the scope and spirit of the invention as described and defined in the following claims.

What is claimed is:

1. A child car seat for restraining a child seated in the car seat, the child car seat comprising
a seat shell including a bottom seat portion and a back support portion,
a barrier shield,
means for supporting the barrier shield above the bottom seat portion for pivoting movement about a pivot axis between an initial position a first distance away from the bottom seat portion and a child-restraining position a second distance away from the bottom seat portion, the second distance being less than the first distance,
spring means for yieldably biasing the barrier shield to its initial position, and
harness means for pivoting the barrier shield against the spring means to the child-restraining position in response to forward movement of a child seated in the seat shell away from the back support portion and toward the barrier shield.

2. The child car seat of claim 1, wherein the supporting means includes a U-shaped arm unit connected to the back support portion and the barrier shield is pivotably connected to the U-shaped arm unit.

3. The child car seat of claim 2, further comprising means for visually indicating the position of the barrier shield so that an observer can visually monitor movement of the barrier shield between its initial position and its child-restraining position, the indicating means being mounted on the axle arm.

4. The child car seat of claim 2, wherein the harness means includes a pair of shoulder straps coupled to the back support portion, a releasable buckle coupled to the shoulder straps, and a crotch strap having a first end anchored to the releasable buckle and a second end anchored to the barrier shield.

5. The child car seat of claim 2, wherein the seat shell includes a left side wall and a right side wall arranged in spaced-apart relation to position the bottom seat portion therebetween and the U-shaped arm unit is positioned to engage the left and right side walls during pivoting movement of the barrier shield.

6. The child car seat of claim 1, wherein the supporting means includes a U-shaped arm unit having a left swing arm pivotably connected to the back support portion, a right swing arm pivotably connected to the back support portion, and an axle arm arranged to interconnect the left and right swing arms, and the barrier shield is pivotably connected to the axle arm and arranged to lie between the left and right swing arms.

7. The child car seat of claim 6, wherein the barrier shield includes a top shell coupled to a bottom shell to define an interior region therebetween and the axle arm extends through the interior region.

8. The child car seat of claim 7, wherein the spring means includes a coiled spring lying in the interior region and interconnecting the barrier shield and the axle arm.

9. The child car seat of claim 7, wherein the axle arm includes a left pivot axle connected to the left swing arm, a right pivot axle connected to the right swing arm, and an offset member arranged to interconnect the left and right pivot axles, and the spring means lies in the interior region and interconnects the offset member and the bottom shell.

10. The child car seat of claim 7, wherein the top and bottom shells cooperate to define an opening into the interior region of the barrier shield and further comprising means for visually indicating the position of the barrier shield through said opening in the barrier shield so that an observer can visually monitor movement of the barrier shield between its initial position and its child-restraining position, the indicating means being mounted on the axle arm and arranged to confront said opening in the barrier shield during pivoting movement of the barrier shield about the axle arm.

11. The child car seat of claim 5, wherein the axle arm includes a left pivot axle connected to the left swing arm, a right pivot axle connected to the right swing arm, and an offset member arranged to interconnect the left and right pivot axles, and the spring means interconnects the offset member and the bottom shell.

12. The child car seat of claim 1, wherein the seat shell further includes strap guide means for slidably receiving a harness strap and the harness means includes a harness strap assembly having a first portion coupled to the pivotable barrier shield, a second portion coupled to the back support portion, and a third portion between the first and second portions passing through the strap guide means.

13. The child car seat of claim 12, wherein the bottom seat portion is formed to include the strap guide means.

14. A child car seat for restraining a child seated in the car seat, the child car seat comprising
a seat shell including a bottom seat portion and a back support portion,
strap guide means coupled to the bottom seat portion for slidably receiving a harness strap,
a barrier shield,
means for supporting the barrier shield above the bottom seat portion for pivoting movement about a horizontal pivot axis between an initial position and a child-restraining position so that the pivotable barrier shield lies adjacent to a thigh region of child seated in the seat shell, and
a child-restraining harness assembly coupled to the seat shell, the child-restraining harness assembly including a crotch strap having a fixed end coupled to the pivotable barrier shield and a free end passing through the strap guide means coupled to the bottom seat portion and a shoulder strap coupled to the back support portion of the seat shell and the free end of the crotch strap.

15. The child car seat of claim 14, wherein the strap guide means includes a buckle formed to include a strap guide slot receiving the crotch strap and a buckle case appended to the bottom seat portion and formed to include means for releasably retaining the buckle therein.

16. The child car seat of claim 14, wherein the child-restraining harness assembly further includes strap adjustment means for moving the crotch strap in the strap guide means to pivot the barrier shield toward its child-restraining position so that the barrier shield is moved to contact the thigh region of an occupant seated in the seat shell to establish the initial position of the barrier shield.

17. The child car seat of claim 16, wherein the bottom seat portion is formed to include a buckle-receiving slot, the strap guide means includes a buckle including means for engaging the buckle-receiving slot and a strap-receiving slot, and a portion of the crotch strap between the fixed end and the free end slidably passes through the strap-receiving slot formed in the buckle.

18. The child car seat of claim 17, wherein the supporting means includes a U-shaped arm unit having a left swing arm pivotably connected to the back support portion, a right swing arm pivotably connected to the back support portion, and an axle arm arranged to interconnect the left and right swing arms and pivotably support the barrier shield, and the buckle-receiving slot is formed in the bottom seat portion to lie midway between the left and right swing arms.

19. The child car seat of claim 18, wherein the axle arm includes a left pivot axle connected to the left swing arm, a right pivot axle connected to the right swing arm, and an offset member arranged to interconnect the left and right pivot axles.

20. The child car seat of claim 19, further comprising a spring interconnecting the offset member and the bottom shell.

21. The child car seat of claim 14, further comprising means for yieldably biasing the pivotable barrier shield to its initial position.

22. The child car seat of claim 21, wherein the biasing means is a spring interconnecting the barrier shield and the supporting means.

23. The child car seat of claim 21, wherein the supporting means includes an axle arm pivotably supporting the barrier shield and an offset portion appended to the axle arm and the biasing means is a spring interconnecting the barrier shield and the offset portion.

24. The child car seat of claim 21, wherein the barrier shield is formed to include an interior region and the biasing means is situated in the interior region.

25. The child car seat of claim 24, wherein the supporting means includes an axle arm extending through the interior region and pivotably supporting the barrier shield and an offset portion engaging the axle arm and lying in the interior region and the biasing means is a spring lying in the interior region and interconnecting the barrier shield and the offset portion.

26. The child car seat of claim 24, wherein the barrier shield includes a top shell coupled to a bottom shell to define the interior region therebetween and the fixed end of the crotch strap extends into the interior region and contacts the bottom shell.

27. The child car seat of claim 14, wherein the child-restraining harness assembly further includes means for tightening the shoulder strap against a child seated in the seat shell to cause the crotch strap to slide in the strap guide means and pivot the barrier shield downwardly toward the bottom seat portion from its initial position to its child-restraining position in response to movement of the seated child and shoulder strap away from the back support portion of the seat shell so that the barrier shield is moved closer to the bottom seat portion to minimize ejection of the child from the seat shell underneath the barrier shield.

28. A child car seat comprising a seat shell including a bottom seat portion having a buckle case, a back support portion, a left side wall adjacent to one side of the bottom seat portion, and a right side wall adjacent to an opposite side of the bottom seat portion, a barrier shield, means for supporting the barrier shield above the bottom seat portion for pivoting movement about a horizontal pivot axis between an initial position and a child-restraining position, the supporting means including means for engaging the left and right side walls of the seat shell during pivoting movement of the barrier shield, and a child-restraining harness assembly coupled to the seat shell and the barrier shield, the child-restraining harness assembly including a buckle including strap guide means for slidably receiving a harness strap and means for releasably engaging the buckle case and a strap appended to the barrier shield and engaging the strap guide means.

29. The child car seat of claim 28, wherein the seat shell further includes means for releasably engaging a buckle including strap guide means for slidably receiving a harness strap and the child-restraining harness assembly includes the buckle, a crotch strap having a fixed end coupled to the pivotable barrier shield and a free end engaging the strap guide means on the buckle, and a shoulder strap coupled to the back support portion of the seat shell and the free end of the crotch strap.

30. The child car seat of claim 29, wherein the supporting means includes an axle arm, the barrier shield is pivotably mounted on the axle arm, and further comprising means for visually indicating the position of the barrier shield so that an observer can visually monitor movement of the barrier shield between its initial position and its child-restraining position, the indicating means being mounted on the axle arm.

31. A child car seat comprising a seat shell including a bottom seat portion and a back support portion, a barrier shield formed to include an interior region and window opening into the interior region, means for supporting the barrier shield above the bottom seat portion for pivoting movement about a horizontal pivot axis through an angle of rotation between an initial position and a child-restraining position, harness means for pivoting the barrier shield about the horizontal pivot axis in response to movement of a child in the seat shell, and means for indicating the angle of rotation of the barrier shield about the horizontal pivot axis, the indicating means including a position display panel appended to the supporting means and positioned to lie in the interior region of the barrier shield in confronting relation to the window opening formed in the barrier shield.

32. A child car seat for restraining a child seated in the car seat, the child car seat comprising a seat shell formed to include a seat portion having a back edge and a back support portion appended to the back edge and extending upwardly therefrom, an axle, means for mounting the axle to the seat shell, the mounting means being movable so that the axle can be positioned to lie both in a first position in front of the back support portion above the seat portion in a horizontal orientation defining a horizontal axis, and in a second position away from the first position, a barrier shield pivotably mounted to the axle for pivoting movement about the horizontal axis relative to the axle, and a harness including a pair of shoulder straps coupled to the back support portion, a connecting device coupled to the shoulder straps, and a crotch strap having a first end anchored to the connecting device and a second end anchored to the barrier shield.

33. The child car seat of claim 32, further comprising a buckle that is formed to include a strap guide slot and means mounted underneath the seat portion for retaining and releasing the buckle, the crotch strap being slidably received by the strap guide slot.

34. The child car seat of claim 33, further comprising a spring interconnecting the barrier shield and the axle, the spring being positioned to yieldably bias the barrier shield to an initial position, and wherein the harness and the buckle cooperate to rotate the barrier shield away from the initial position in response to movement of the child away from the back support portion.

35. A child car seat for restraining a child seated in the car seat, the child car seat comprising a seat shell formed to include a seat portion having a back edge and a back support portion appended to the back edge and extending upwardly therefrom, an axle, means for mounting the axle to the seat shell, the mounting means being movable so that the axle can be positioned to lie both in a first position in front of the back support portion above the seat portion in a horizontal orientation defining a horizontal axis, and in a second position away from the first position, a barrier shield pivotably mounted to the axle for pivoting movement about the horizontal axis relative to the axle, the barrier shield including a top shell coupled to a bottom shell to define an interior region therebetween, the axle extending through the interior region, and a coiled spring interconnecting the barrier shield and the axle, the coiled spring being positioned to lie in the interior region.

36. The child car seat of claim 35, wherein the axle includes a left pivot axle connected to the left swing arm, a right pivot axle connected to the right swing arm, and an offset member arranged to interconnect the left and right pivot axles, and further comprising a coiled spring positioned to lie in the interior region and arranged to interconnect the offset member and the bottom shell.

37. A child car seat for restraining a child seated in the car seat, the child car seat comprising a seat shell including a bottom seat portion and a back support portion, a barrier shield supported above the bottom seat portion and pivotal from an initial position to a child-restraining position, a child-restraining harness attached to the seat shell for extending over an upper torso of a child, when sitting in the car seat, for restraining forward motion of the child, said child-restraining harness also connected to said barrier shield, said barrier shield located at the initial position when the child is harnessed into the child seat, and wherein the child-restraining harness moves the barrier shield from the initial position to the child-restraining position when the child harnessed into the child seat has its upper torso moved forward to push against the child-restraining harness.

38. A child seat according to claim 37 wherein the barrier shield is yieldably biased to its initial position.

39. A child seat according to claim 38, including a supporting means moveably connected to the seat shell and rotatably connected to the barrier shield for providing the support of the barrier shield above the seat shell, and wherein the supporting means is configured U-shaped and with the arm of the U-shape being connected to the back portion of the seat shell and a connector between the legs rotatably supporting the barrier shield.

40. A child car seat according to claim 38, including a supporting means for supporting the barrier shield above the bottom seat portion, and wherein the supporting means includes a U-shaped arm unit having a left swing arm pivotably connected to the back support portion, a right swing arm pivotably connected to the back support portion, and an axle arm arranged to interconnect the left and right swing arms, and the barrier shield is pivotably connected to the axle arm and arranged to lie between the left and right swing arms.

41. A child car seat, according to claim 40, wherein the barrier shield includes a top shell coupled to a bottom shell to define an interior region therebetween and the axle arm extends through the interior region.

42. A child car seat, according to claim 41, including a spring means for the biasing of the barrier shield to its initial position and wherein the spring means includes a coiled spring lying in the interior region and interconnecting the barrier shield and the axle arm.

43. A child seat according to claim 37, including a supporting means moveably connected to the seat shell and rotatably connected to the barrier shield for providing the support of the barrier shield above the seat shell, and wherein the supporting means is configured U-shaped with the arms of the U-shape being connected to the back portion of the seat shell and the connector between the legs rotatably supporting the barrier shield.

44. A child car seat according to claim 37, including a supporting means for supporting the barrier shield above the bottom seat portion, and wherein the supporting means includes a U-shaped arm unit having a left swing arm pivotably connected to the back support portion, a right swing arm pivotably connected to the back support portion, and an axle arm arranged to interconnect the left and right swing arms, and the barrier shield is pivotably connected to the axle arm and arranged to lie between the left and right swing arms.

45. A child car seat, according to claim 44, wherein the barrier shield includes a top shell coupled to a bottom shell to define an interior region therebetween and the axle arm extends through the interior region.

46. A child car seat, according to claim 37, wherein the child-restraining harness includes a pair of shoulder straps coupled to the back support portion, a releasable buckle coupled to the shoulder straps, and a crotch strap having a first end anchored to the releasable buckle and a second end anchored to the barrier shield.

47. A child car seat, according to claim 37, wherein the seat shell further includes strap guide means for slidably receiving a harness strap and the child-restraining harness includes a harness strap assembly having a first portion coupled to the pivotable barrier shield, a second portion coupled to the back support portion, and a third portion between the first and second portions passing through the strap guide means.

* * * * *